United States Patent
Krco et al.

(10) Patent No.: US 8,711,788 B2
(45) Date of Patent: Apr. 29, 2014

(54) ARRANGEMENTS AND METHOD RELATING TO COMMUNICATION BEARERS

(75) Inventors: Srdjan Krco, Dublin (IE); Srdjan Kostic, Kista (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1055 days.

(21) Appl. No.: 12/593,190

(22) PCT Filed: Mar. 28, 2007

(86) PCT No.: PCT/EP2007/052961
§ 371 (c)(1),
(2), (4) Date: Mar. 10, 2010

(87) PCT Pub. No.: WO2008/116502
PCT Pub. Date: Oct. 2, 2008

(65) Prior Publication Data
US 2010/0322162 A1    Dec. 23, 2010

(51) Int. Cl.
H04W 4/00    (2009.01)

(52) U.S. Cl.
USPC .......................................... 370/329; 370/312

(58) Field of Classification Search
USPC ............................................ 370/329
See application file for complete search history.

(56) References Cited

U.S. PATENT DOCUMENTS

| | | | |
|---|---|---|---|
| 6,889,050 B1 * | 5/2005 | Willars et al. | 455/452.2 |
| 2004/0127237 A1 * | 7/2004 | Hurtta | 455/466 |
| 2007/0183458 A1 * | 8/2007 | Bouazizi et al. | 370/498 |
| 2007/0238452 A1 * | 10/2007 | Haviala | 455/418 |
| 2007/0286203 A1 * | 12/2007 | Lv et al. | 370/395.2 |
| 2008/0170490 A1 * | 7/2008 | Connors et al. | 370/203 |
| 2008/0170529 A1 * | 7/2008 | Connors et al. | 370/312 |
| 2009/0262704 A1 * | 10/2009 | Khetawat et al. | 370/331 |

OTHER PUBLICATIONS

PCT International Search Report, mailed Feb. 4, 2008, in connection with International Application No. PCT/EP2007/052961.
3GPP Technical Specification TS23.107 V6.4.0 "Technical Specification Group Services and System Aspects: Quality of Service (QoS) concept and architecture (Release 6)" Mar. 1, 2006, pp. 1-40, XP002465594.
3GPP Technical Specification TS23.060 V7.4.0 "Technical Specification Group Services and System Aspects; General Packet Radio Service (GPRS); Service description; Stage 2 (Release 7), Chapter 12, Transmission" Mar. 1, 2007, pp. 159-174, XP002465595.

* cited by examiner

*Primary Examiner* — Gerald Smarth
(74) *Attorney, Agent, or Firm* — Potomac Patent Group PLLC

(57) ABSTRACT

The present invention relates to a network node supporting communication of information and comprising bearer service handling means supporting one or more bearer services, each defined by a number of attributes, and bearer service managing means for controlling enablement, modification and maintenance of bearer services with particular QoSs, resource handling means adapted to distribute resources between bearer services information, attribute handling means adapted to handle attributes QoS profile for one or more of traffic classes and admission control means adapted to control bearer service resource allocation. The managing means are adapted to handle a first additional bearer service attribute comprising information about a time period between at least two consecutive information transfer events and a second additional bearer service attribute comprising information relating to the amount of data to be transferred during at least one of said at least two consecutive information transfer events. The managing means are adapted to activate a bearer service adapted to handle repetitive information transfer at a first transfer event, to provide for deactivation of an activated repetitive bearer service when a respective information transfer events ends and reactivation of the respective bearer service resources at, initiation of a subsequent information transfer event.

19 Claims, 11 Drawing Sheets

| TRAFFIC CLASS | CONV. CLASS | STREAM. CLASS | INTERACT. CLASS | BACKG. CLASS | REP. CLASS |
|---|---|---|---|---|---|
| MAX BITRATE | X | X | X | X | X |
| DEL. ORDER | X | X | X | X | X |
| MAX SDU SIZE | X | X | X | X | X |
| SDU FORMAT INFO. | X | X | | | X |
| SDU ERROR RATIO | X | X | | X | X |
| RESIDUAL BIT ERROR RATIO | X | X | X | X | X |
| DEL. OF ERRONEOUS SDU:S | X | X | X | X | X |
| TRANSFER DELAY | X | X | X | | X |
| GUARANTEED BIT RATE | X | X | | | X |
| TRAFFIC HANDLING PRIORITY | | | X | | X |
| ALLOCATION/RETENTION PRIORITY | X | X | X | X | X |
| SOURCE STATISTICS DESCRIPTOR | X | X | | | X |
| SIGNALLING INDICATION | | | X | | X |
| TIME INTERVAL | | | | | X |
| INFO AMOUNT AT TRANSFER EVENT | | | | | X |

Fig. 9

ARRANGEMENTS AND METHOD RELATING TO COMMUNICATION BEARERS

TECHNICAL FIELD

The present invention relates to arrangements or network nodes supporting communication of information of different traffic types particularly packet data and to a method for transfer of information.

BACKGROUND

The development during the last decade or during the last years has made it possible for users to access many different types of services in different manners. Services are available over fixed as well as wireless networks and there is a large variety of services such as speech, data services, video services, media services etc. Access to the increasing number of services can be provided using different access technologies e.g. via PSTN (Public Switched Telecommunications Network), via mobile communication networks, television channels or via cable or satellite, over Internet provided over PSTN or broadband, and over wireless access networks, for example WLANs (Wireless Local Area Network). For wireless user stations services can be accessed in many different ways.

The requirements are different for different types of services. Therefore the Quality of Service (QoS) concept has been introduced.

3G mobile networks (3GPP, Third Generation Partnership Project) support four different types of radio access bearers for the communication links. These radio access bearers (RABs) are of types; conversational, streaming, interactive and background and they differ in the supported quality of service (QoS).

For a conversational RAB the requirements are stringent and it is important that there is a low delay and preservation of time relation (variation) between information entities of the traffic stream. A typical example of a conversational application is speech.

A streaming RAB is required to preserve the time relation in the same manner as a conversational RAB but it does not guarantee a low delay. A typical example is streaming video.

An interactive RAB is suitable for applications such as web browsing since it is merely used for applications following a request-response pattern. This is a best effort RAB. Finally, a background RAB can be used for applications when data is not expected within a certain time frame. Examples of applications for which a background RAB is appropriate are e-mails and background downloads etc. The background RAB is also a best effort RAB.

The behaviour of the RABs discussed above is designed for, and suitable for human-to-human communication, when an RAB is needed continuously as long as conversation is ongoing, or for human-to-computer communication, e.g. web browsing (an RAB can go to inactive state while waiting for certain buffers to fill up).

It is however estimated that in the near future there will be hundreds of millions of mobile connections and that more than fifty percent of these connections will be machine or other non-human originated connections. In fact, such non-human originated connections will have an entirely different traffic pattern than the majority of connections of today which have a human origin. It is believed that monitoring networks such as sensor networks monitoring industrial processes will be required to forward measurement data to operators or to a central database or somewhere else more or less periodically.

One way to handle such transfer events is to set up a new communication link or an RAB for each transfer event. However, it should be borne in mind that often the amount of data sent during each transfer event will be very small, in some applications for example only a couple of bits. This means that the establishment and release of an RAB for that purpose only involves an un-proportionally high use of signalling data in relation to the actual user data transferred each time, i.e. establishment and release of an RAB each time involves a significant signalling overhead. This means, inherently, that the utilization of network resources will be very poor. Frequent establishment and release of communication links also negatively affects the machine generating the information to be transferred. This is particularly so in the case of sensor networks which often have limited energy resources and therefore the lifetime of such machines will be and for example energy storages will have to be replaced.

Another way to handle such events could be to establish an RAB and keep it indefinitely. However, in that case network resources are also unnecessarily occupied when there is no data or no information to be sent, and only very small amounts are sent each time. This reduces the overall network capacity and it is a waste of signalling as well as traffic resources, which also reduces the ability and capacity to support other services and users.

It has been established that if an interactive RAB is set up for handling repetitive transfer of information, it could be configured in such a way that it goes to an inactive state (sleep mode) when there is no information or data to transfer. Then most of the network resources are released and they could be made to "wake up" again when a designated buffer is filled up. However, there is no way to guarantee access to network resources every time that a transfer event to be carried out. This means that once a buffer is filled up and data should be transferred, network resources have to be allocated again. Then it is not certain that network resources actually are available since in the meantime they may have been occupied by other users. In general, network resources are allocated on a first come—first served basis and there is no possibility to take into account any repetitive transfer pattern.

A conversational RAB can not be put into a passive, sleep state. It is either fully active and network resources allocated, or it does not exist. This is applicable also for a streaming RAB.

It is also not satisfactory to use a background RAB since no timely delivery of information can be guaranteed which, is often important e.g. in process control monitoring data, medical data transfer etc.

Thus, today there is no satisfactory way of handling transfer of information, particularly of comparably small amounts of data, occurring more or less regularly, or following a repetitive transfer pattern.

SUMMARY

It is therefore an object of the present invention to provide a means for handling the transfer of information which needs to be transferred in a repetitive manner. Particularly a solution is needed through which information can be transferred with a given, fixed, or varying frequency and through which network resources are not wasted. Even more particularly a solution is needed through which the usage of signalling resources can be kept down. A solution is also needed through which the relationship between used signalling resources and transferred amount of information can be kept optimum, i.e. maximum transferred amount of data for minimum usage of signalling resources. Furthermore a solution is needed which in an efficient, reliable and uncomplicated manner enables transfer of data. Even more particularly a solution is needed through which small amounts of information, particularly machine generated data, can be transferred, in a repetitive manner, timely, securely and without wasting either signalling resources or traffic resources. Particularly network nodes are needed through which one or more of the above mentioned objects can be achieved.

It is further an object of the present invention to provide a method for transfer of information in a repetitive manner and through which one or more of the above mentioned objects can be achieved.

In order to fulfil one or more of the above mentioned objects, a network node supporting communication of packet data is provided which comprises bearer service handling means and supports one or more bearer services, each defined by a number of attributes. The network node is, according to the invention, adapted to support a bearer service adapted to handle repetitive data transfer. Particularly the managing means are adapted to handle a first additional bearer service attribute comprising information about a time period between at least two consecutive information transfer events and a second additional bearer service attribute comprising information relating to the amount of data information to be transferred a transfer event. The managing means are adapted to provide for deactivation of an activated repetitive bearer service and releasing resources when a first of two, consecutive information transfer events ends and for reactivation at the subsequent data information transfer event as indicated by said first additional attribute.

It comprises bearer service (BS) managing means controlling enablement, modification and maintenance of bearer services with particular QoSs, resource handling means adapted to distribute resources between bearer services requesting transfer of information. It also comprises bearer attribute handling means adapted to provide handle bearer service attributes, in one embodiment also for mapping between bearer service handling attributes and QoS attributes/profile given for a number of traffic classes, admission control means adapted to control and hold information about bearer service resource allocation.

A method for handling repetitive transfer of information in a mobile network supporting communication of packet data is therefore also provided which comprises the steps of; providing a first additional bearer service handling attribute indicating a time period to pass between at least a first and a second consecutive information transfer event; providing a second additional bearer service handling attribute indicating the amount of information to be transferred at least at said first information transfer event; using said first and second additional attributes to provide or set up a bearer for the repetitive information transfer and to reserve resources therefore, in a core network and in a radio access network; maintaining the set up bearer until the first transfer event is completed, i.e. until the information amount as indicated by the second additional attribute has been transferred; then automatically deactivating the bearer; automatically reactivating the bearer after lapse of the time interval indicated by the first additional attribute, and repeating maintenance of, deactivation and reactivation of the bearer as indicated by the first and second additional attributes until occurrence of a given event.

It is an advantage of the present invention that a new or additional RAB state, or modified RAB states, for periodic information transfer are provided which involves a minimum of signalling overhead and through which traffic resources are saved. It is particularly an advantage of the present invention that transfer of information, particularly machine generated data, can be provided for in a reliable and resource usage effective manner. Particularly it is an advantage that a repetitive or periodical transfer pattern can be taken into account and that it still can be assured that the information (data) can be transferred in a timely manner, when desired. Even more particularly it is an advantage that small amounts of information, particularly machine generated data, can be transferred with a fixed or variable periodicity without unnecessarily occupying resources and without requiring an extensive signalling, particularly with respect to the comparatively small amounts of data that are to be transferred. Moreover it is an advantage of the invention that a plurality of repetitive information transfer services can be allowed without wasting resources for other users or services, particularly bearer services for transfer of small amounts of machine generated data, e.g. data for monitoring purposes, that are expected to be extensive and frequent in the near future.

In addition, it is an advantage that a flexible solution enabling handling of a traffic class with a repetitive pattern is provided, and further that network capacity planning can be improved and that a large number of monitoring networks can be handled. It is also an advantage that a solution is provided which enables increasing the capacity of mobile networks and a more efficient usage of the actual available capacity than hitherto.

BRIEF DESCRIPTION OF THE DRAWINGS

The invention will in the following be further described, in a non-limiting manner, and with reference to the accompanying drawings, in which:

FIG. 9 shows an example of UMTS/radio access bearer attributes defined for state of the art bearer traffic classes and, additionally, for repetitive class according to the present invention.

DETAILED DESCRIPTION

Figure 1:
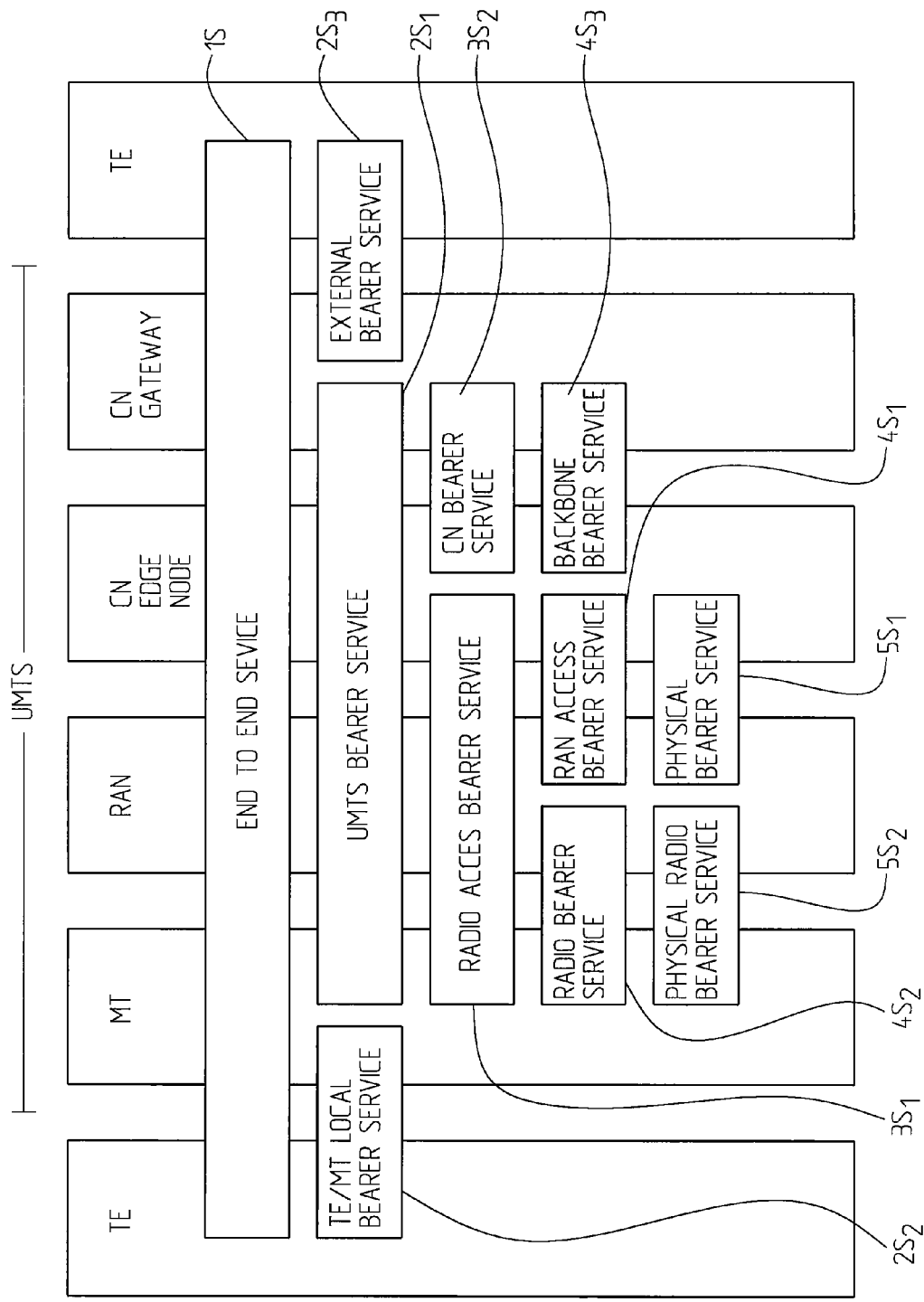
FIG. 1 shows a UMTS bearer service layer architecture as described in 3GPP TS 23.107.

According to the invention a new bearer state, for periodic data transfer, is introduced which requires only a minimum of signalling overhead and which takes into account announced transfers in the future when new calls have to be admitted into a system. Alternatively existing bearer classes can be provided with a feature of taking repetitiveness into account.

Preferably signalling messages are exchanged only once, namely during the initial repetitive bearer or RAB establishment. The users will define the time period (dynamically or statically or modifiably, upon request) between subsequent information transfer events, and the time the repetitive bearer has to be active during one session, particularly corresponding to the amount of information to be sent during a transfer event. All subsequent repetitive bearer or RAB deactivations and reactivations will be done automatically by the network, i.e. nodes in the network which are affected, without requiring exchange of signalling messages. The network or network nodes use parameters, said first and second additional attributes as referred to above, provided by the user during the initial repetitive bearer or RAB establishment in respective admission control algorithms when calculating availability of network resources for new calls.

Particularly the managing means of each respective network node are adapted to hold information about the first and second additional bearer service attributes. Additionally the managing means are preferably adapted to control the resource handling means which are adapted to release bearer resources at termination of a transfer event and reserve resources for reactivation at subsequent transfer events. The managing means of a node are furthermore preferably adapted to communicate information relating to said first and second additional attributes to managing means of all nodes involved in a bearer set up for the repetitive bearer service, particularly end-to-end. In that manner resources can be reactivated when needed throughout the network at subsequent transfer events.

The managing means particularly comprise or communicate with admission control means holding information about all available resources of the network node and about all resources allocated to bearer services. Said admission control means are particularly adapted to consider information about said first and second additional attributes at allocation of resources, among other things to new calls.

Preferably the managing means comprise or communicate with a timer, said timer being adapted to be set to said repetitive time interval, i.e. the first additional attribute. It is also adapted to, upon lapse of said time interval, trigger re-establishment of the respective repetitive bearer.

Particularly the holding means comprise means for holding and controlling the first additional attribute defining the timer interval. The managing means comprise attribute control means adapted to control the attribute handling means, and they are adapted to, at each transfer event, establish if the value of the first attribute is to be maintained or modified, and/or to establish, for each transfer event, if the value of the second additional attribute is to be maintained or modified. Alternatively this may be done with a certain frequency, not corresponding to the frequency given by the first attribute, or at any time upon request. Detecting means may be provided which are adapted to establish if the first attribute value is to be maintained or modified, either with given time intervals, at each subsequent transfer event, or upon request. In one embodiment the managing means, or the holding means, hold the first and second additional attributes until reception of a request to change the first and/or second attribute, thus maintaining a periodic, repetitively activated bearer service.

The managing means or admission control means may also comprise or communicate with storing means for storing network parameters and references needed at set-up of a repetitive bearer at a first information transfer event and updated network parameters and references modified at a subsequent transfer event if the first and/or second attribute is/are changed.

In a most advantageous implementation the network node is adapted to handle repetitive information transfer comprising data, even more particularly machine generated data, for example generated by a sensor network or a monitoring network. Alternatively, or additionally, it may be adapted to handle information comprising speech.

The managing means are most preferably adapted to, for handling repetitive transfer events, send/receive control messages at establishment of an initial repetitive bearer and to perform subsequent, repetitive bearer deactivations/reactivations automatically in agreement with the information of said first and second attributes.

The control messages are then sent to all other nodes involved in the repetitive bearer service. The node may comprise a radio access network node, for example an RNC (Radio Network Controller), a BS (Base Station) or Node B, an AP (Access Point) in which case it receives signalling information comprising the first and second additional attributes from a core network node. The node may also comprise a core network node, for example an SGSN (Serving GPRS Support Node), a CN (Core Network) edge node, or a CN gateway node, which comprises substantially the same functionality. In that case information needs to be signalled to other concerned core network nodes, e.g. a GGSN (Gateway GPRS Support Node) etc. and to concerned radio access network nodes. The network node may also comprise a mobile terminal, for example a terminal equipment, a PC, a Laptop top, a palmtop, or more generally a mobile station. The first and second additional parameters are normally first input via a user interface on a mobile station and then they are provided to the core network, initiating the modified radio access bearer assignment.

Corresponding optional or preferred embodiments are also provided for the inventive method in order to achieve one or more of the above mentioned objects and preferred embodiments are given by the respective appended sub-claims.

The invention can be said to consist in introduction of a new bearer class (or "old" bearer classes with an extended functionality) which is enabled through introduction of two additional attributes. In other respects the handling means are substantially the same as those described in for example 3GPP TS 23.107 V6.4.0. To explain the functioning of the bearer service and end user QoS requirements, reference is made to FIG. 1, FIG. 2 and FIG. 3. There are a number of technical requirements for QoS. They can be defined by means of a set of attributes, which should meet a number of criteria, for example for UMTS QoS, the UMTS QoS control mechanisms shall provide QoS attribute control on a peer to peer basis between user equipment and 3G gateway node. Furthermore there should be a mapping between application requirements and UMTS services, applications or special software in user equipment or 3G gateway node should be able to indicate QoS values for the their data transmissions, the QoS behaviour should be dynamic etc.

Network services are normally considered end-to-end, i.e. from a terminal equipment to another and a network service may have a certain QoS. In order to realise a certain network QoS, a bearer service with clearly defined characteristics and functionality is to be set up from the source to the destination of a service and a bearer service includes all aspects needed to enable the provision of a contracted QoS. Among others these aspects involve control signalling, user plane transport and QoS management functionality.

FIG. 1 shows an UMTS bearer service layered architecture wherein each bearer service on a specific layer is adapted to offer its individual services using services provided by the layers below.

A TE (Terminal Equipment) is here connected to the UMTS network by use of a mobile termination MT and the end-to-end service 1S on the application level uses bearer services of underlying networks (normally several networks and not only UMTS). The end-to-end service 1S used by the TE is realised using a TE/MT local bearer service $2S_2$, a UMTS bearer service $2S_1$ and an external bearer service $2S_3$. The TE/MT local bearer service and the external bearer service $2S_3$ will not be further discussed herein since here it is the UMTS bearer service $2S_1$ that provides the UMTS QoS.

The UMTS bearer service $2S_1$ consists of the radio access bearer service $3S_1$ and the CN (Core Network) bearer service $3S_2$. The radio access bearer service $3S_1$ provides transport of signalling and user data between MT and CN edge node with the QoS according to negotiated UMTS bearer service. The core network bearer service $3S_2$ connects the UMTS CN edge node with the CN gateway to the external network. This service efficiently controls and utilizes the backbone network in order to provide the contracted UMTS bearer service.

The radio access bearer service $3S_1$ is realised by a radio bearer service $4S_2$ and RAN access bearer service $4S_1$. The radio bearer service $4S_2$ covers the aspects of the radio interface transport and is here particularly provided by the UTRAN (UMTS Terrestrial Radio Access Network) FDD/TDD (Frequency Division Duplex/Time Division Duplex) or the GERAN (GSM Edge Radio Access Network). The RAN access bearer service $4S_1$ together with the physical bearer service $5S_1$ provides the transport between RAN and CN. RAN access bearer services $4S_1$ for packet traffic provide different bearer services for a variety of QoSs. The RAN access bearer service $4S_1$ is provided by the Iu or Gb bearer service.

The core network bearer service $3S_2$ uses a generic backbone network service $4S_3$ and it can be selected according to the choice of the operator in order to fulfil the QoS requirements of the core network bearer service $3S_2$.

Figure 2:
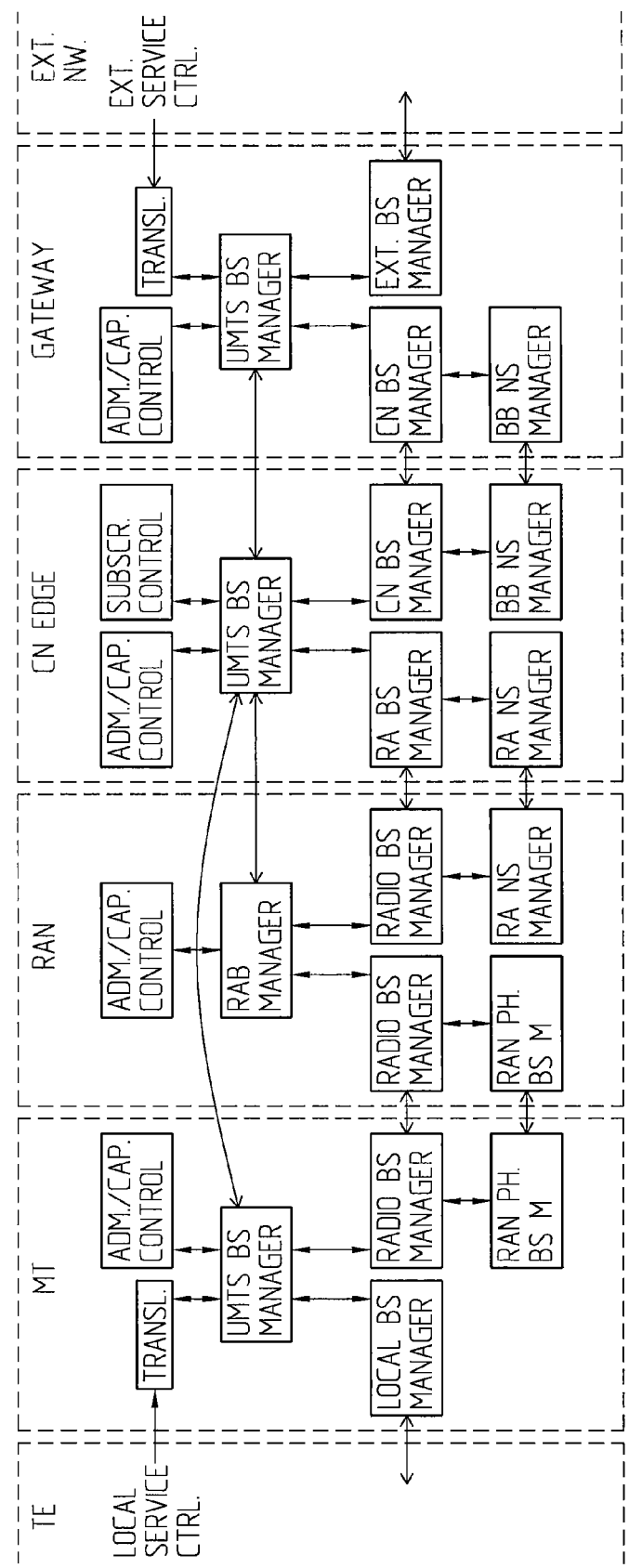
FIG. 2 shows control plane QoS management functions for the architecture shown in FIG. 1.
Figure 3:
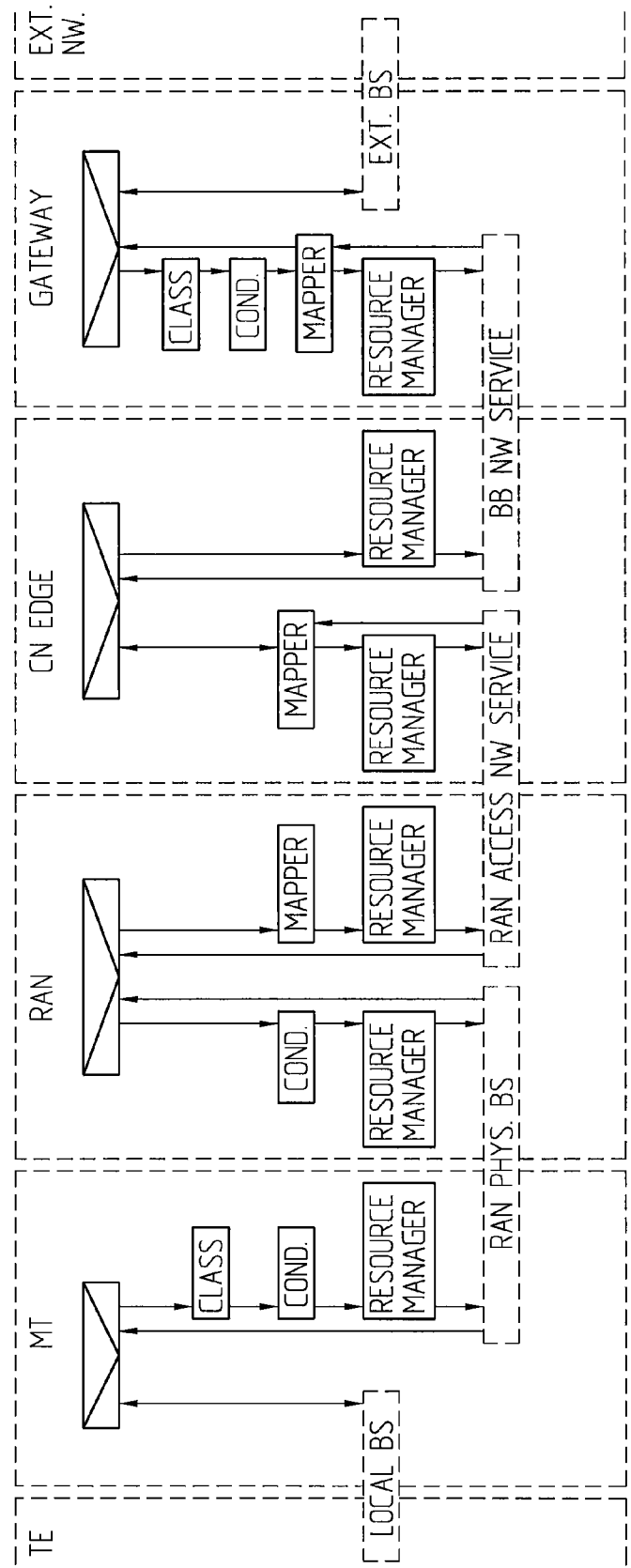
FIG. 3 shows user plane QoS management functions for the architecture shown in FIG. 1.

With reference to state of the art figures FIG. 2 and FIG. 3 the QoS management functions for UMTS bearer service in the control and the user plane respectively will be briefly explained.

It should however be clear that the inventive concept is not restricted to being implemented based on UMTS; UMTS is just one specific example.

The intention is to give an overview of the functionality that is needed to establish, modify and maintain, here, a UMTS bearer service with a specific QoS. The QoS management functions of all UMTS nodes are entities which together ensure the provision of the negotiated service between the UMTS bearer service access points whereas the end-to-end service is provided by translating/mapping with UMTS external services.

For QoS management purposes the control plane comprises a number of functions, namely a service manager function for coordinating the functions of the control plane for establishing, modifying and maintaining the service it is responsible for. Furthermore it also provides all user plane Qos management functions with the relevant attributes, signals with peer service managers etc. It also comprises a translation function for converting between internal service primitives for UMTS bearer service control and various protocols for service control of interfacing external networks, including converting between UMTS bearer service attributes and QoS attributes of external network service control protocols. It further comprises admission/capability control means maintaining information about all available resources of a network entity and about all resources allocated to UMTS bearer services. These means determine, for each UMTS bearer service request or modification, whether the required resources can be provided by this entity and it reserves the resources if allocated to the UMTS bearer service. Finally it comprises a subscription control function which will not be further discussed herein.

FIG. 2 shows the QoS management functions for UMTS bearer service in the control plane. The translation functions (Trans.) in the MT (Mobile Terminal) and the gateway convert between external service signalling and internal service primitives including translation of service attributes. The nodes MT, CN edge and gateway comprise a UMTS BS (bearer service) manager which signal between each other and via the translation function with external instances to establish or modify a UMTS bearer service. The UMTS BS managers communicate with associated admission/capability control means whether the respective nodes support the specific requested service and whether the required resources are available. The UMTS BS manager in the MT translates the UMTS bearer service attributes into attributes for the local bearer service and requests this service from the local BS manager. The UMTS BS manager of the CN edge translates the UMTS bearer service attributes into RAB service attributes and RAN access bearer service attributes and it translates UMTS bearer service attributes into CN bearer service attributes. The UMTS BS manager of the CN edge also requests its RAN access BS manager, its CN BS manager and the RAB manager in the RAN (Radio Access Network) to provide the required services.

The RAB manager in the RAN verifies with its admission/capability control whether the RAN supports the specific requested service and whether the required resources are available. It translates the RAB service attributes into radio bearer service and RAN access bearer service attributes and requests the radio BS manager and the RAN access BS manager to provide bearer services with the required attributes.

The gateway UMTS BS manager translates the UMTS bearer service attributes into CN bearer service attributes and requests its CN BS manager to provide the service. It also translates the UMTS bearer service attributes into external bearer service attributes and requests this service from the external BS manager. Radio, RAN access and CN BS managers use services provided by lower layers as indicated in FIG. 2 which will not be further discussed herein.

Thin arrows in the figure indicate protocol interfaces whereas thicker arrows indicate service primitive interfaces.

FIG. 3 illustrates the QoS management functions for a UMTS bearer service in the user plane. It comprises a mapping function providing each data unit with a specific marking which is required for reception of the intended QoS at the transfer by a bearer service. It further comprises a classification function assigning data units to established services of an MT according to related QoS attributes if the MT has multiple UMTS bearer services established. It further comprises a resource manager distributing available resources between all services sharing the same resource. It distributes resources according to the required QoS, for example scheduling, bandwidth management and power control for the radio bearer.

There is also provided a traffic conditioner for providing conformance between negotiated QoS for a service and the data unit traffic. This will not be further discussed herein.

The functions of the QoS management functions of the user plane are intended to maintain the data transfer characteristics according to the commitments established by the UMTS BS control functions and expressed by the bearer service attributes. They are provided with the relevant attributes by the QoS management control functions and, according to the present invention, also with the first and second additional attributes.

The classification function (Class.) in the gateway and in the MT assign user data units received from the external bearer service or the local bearer service to the appropriate UMTS bearer service according to the QoS requirements of each user data unit. The traffic conditioner in the MT provides conformance of the uplink user data traffic with the QoS attributes of the relevant UMTS bearer service. The gateway traffic conditioner may provide conformance of the downlink user data traffic with the QoS attributes of the relevant UMTS bearer service, on a per PDP context basis. A traffic conditioner in the RAN forms the downlink data unit traffic according to relevant QoS attributes. A resource manager may also provide the functionality of traffic conditioners etc. Each of the resource managers of a network entity is responsible for a specific resource. The resource manager distributes its resources between all bearer services requesting transfer of data units on these resources. Thereby a resource manager attempts to provide the QoS attributes required for each individual bearer service.

According to the present invention an additional, here called repetitive, bearer type is suggested which is different from conversational, streaming, interactive and background. Alternatively the existing bearer types are extended with an optional functionality. The repetitive bearer class or modified bearer classes, among other things involves the addition of two additional attributes. In other respects the management functions apply as discussed above with reference to FIGS. 1, 2 and 3, which describe the known basic functioning for UMTS bearer services. According to the present invention establishment and release of bearers will be performed in the same manner as discussed above with the difference of modifications due to the addition of the two new attributes and adaptation of the admission algorithm, above denoted admission/capability control, particularly implemented in the concerned nodes discussed above.

According to the present invention signalling messages will be exchanged only once, and that is during the initial RAB establishment. Users will define the time between two consecutive data transfers and the time the RAB has to be active during one session or transfer event. All subsequent RAB activations and deactivations will be done automatically by the network without a need for exchanging signalling messages. The network will use parameters provided by the user during the initial RAB establishment in the admission algorithm when calculating availability of network resources for new calls.

That no signalling messages are required for subsequent transfer events is true if the time period between consecutive transfer events remains the same and if the amount of data or information to be transferred at each transfer event is the same. According to advantageous implementations, the time period between transfer event, or amount of information to be transferred, can be modified e.g. at each transfer event, or with a given periodicity or upon explicit request or when new conditions are to be taken into account. It is however a very small amount of signalling that is needed to indicate the change of the first and/or second additional attribute.

Moreover, establishment and release of repetitive bearers or RABs, will be performed in the same manner as is done for conventional bearers with the addition that two new attributes are to be considered and respective admission algorithms in the nodes are to be adapted accordingly.

Figure 4:
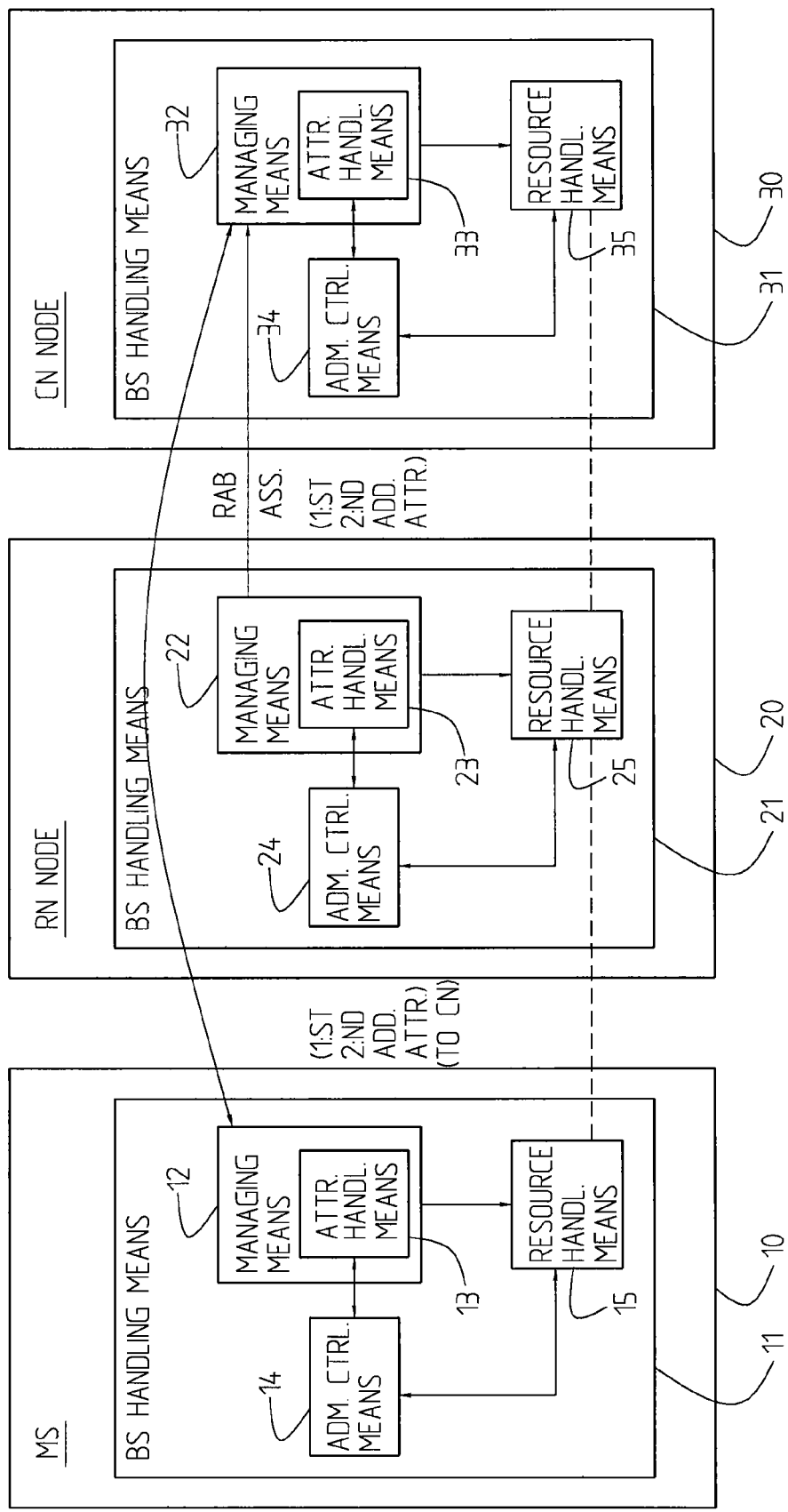
FIG. 4 is a simplified block diagram illustrating an exemplary set of nodes involved for implementation of the inventive concept.

FIG. 4 shows a very simplified block diagram of three network nodes affected by the concept of the present invention, here comprising a mobile station 10, RN node 20 (a radio access network node) and a CN node 30 (a core network node). It should be clear that other nodes may also need to be modified accordingly to take into account the new type of bearer. Since the principles remain the same as for these nodes, this is not illustrated herein.

MS 10 comprises bearer service handling means 11 comprising managing means 12 with attribute handling means 13, admission control means 14 and resource handling means 15. The attribute handling means 13 here handle input of first and second additional attributes which are stored and provided to admission control means 14 and to resource handling means 15. Moreover, when they have been input or when decided, the attributes are provided to CN node 30, more particularly to managing means 32 in CN node of BS handling means 31 so that a modified RAB assignment procedure can be initiated. This modified RAB assignment procedure is substantially the same as in the state of the art but involves introduction of two additional attributes making it possible to introduce repetitive bearers, or bearers with a repetitive functionality.

It should be clear that MS 10 comprises all conventional functionalities of any appropriate mobile station and in that the managing means 12 in addition thereto substantially comprise the functionality as discussed above with reference to FIG. 2 and specified in 3GPP TS 23.107 v6.4.0. Only the functions and means necessary for carrying out the inventive concept are illustrated in a simplified manner in FIG. 4.

RN node 20 comprises bearer service (BS) handling means 21 with managing means 22 comprising attribute handling means 23. Managing means 22 comprise or communicate with admission control means 24 and resource handling means 25 which actually are included in the user plane handling. The managing means 22 are illustrated in a schematical manner and they here comprise some managing functionalities of the control plane and some of the user plane. From the attribute handling means 33 of CN node 30, the first and second additional attributes are provided in addition to other conventional RAB attributes and at least the first and second additional attributes are held in the attribute handling means 23 (or in means associated therewith) until release of the radio bearer is requested or until they are modified as will be discussed further below. The first and second additional attributes also have to be provided to admission control means 24 to enable for reservation of resources at subsequent transfer events and to control the allocation of resources for other services bearing the existence of the repetitive bearer in mind. Only the functions and means specific for carrying out the inventive concept are shown.

A similar procedure has to take place in the CN node 30 and the first and second additional attributes are held in, or in means associated with, the attribute means 33. They are also provided to admission control means 34 as discussed above such that resources can be reactivated and deactivated automatically in agreement with the values of said first and second additional attributes and resources allocated with due regard to other bearer services.

Figure 5:
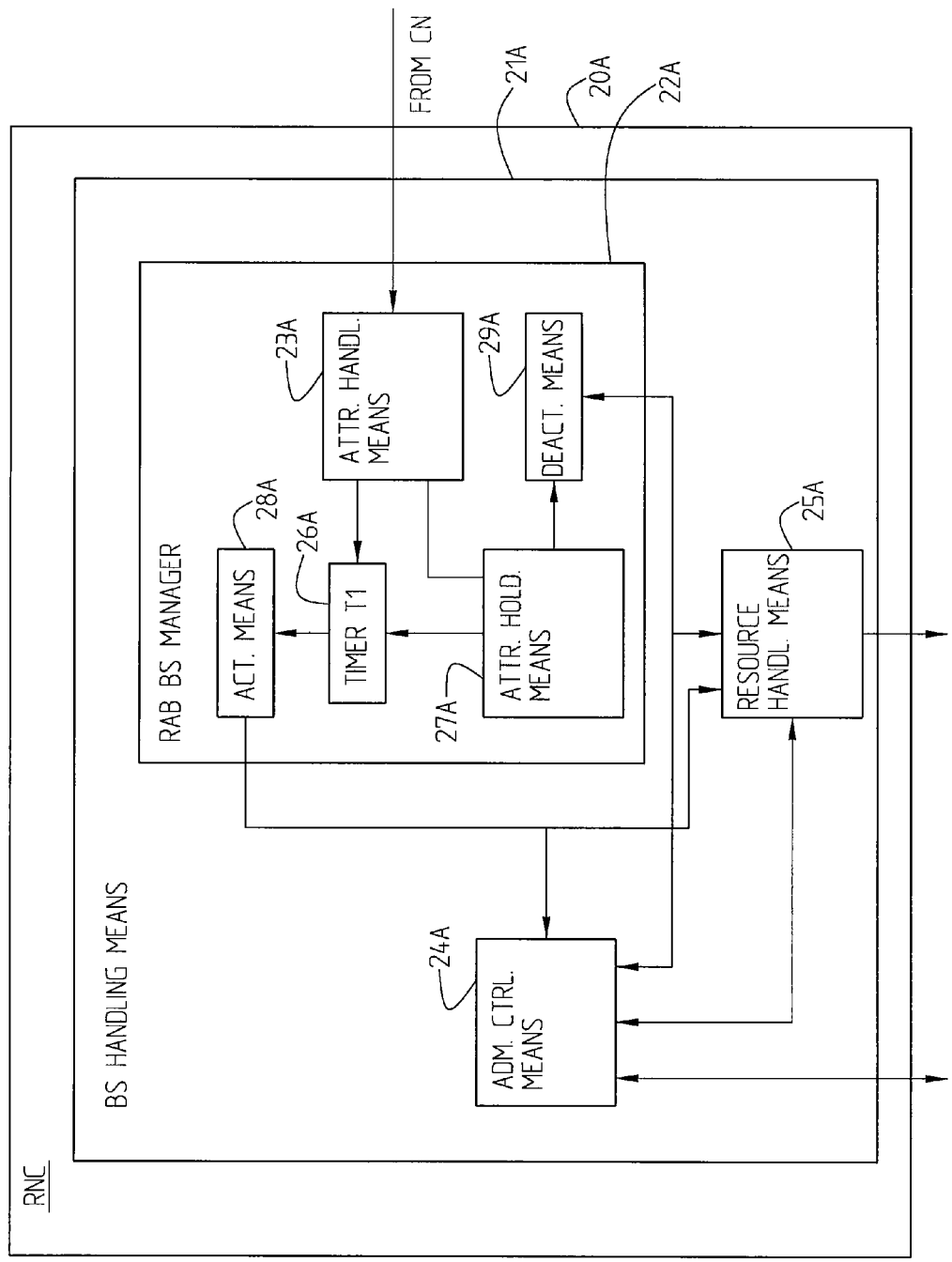
FIG. 5 is a schematical block diagram illustrating a radio access network node in which the inventive concept is implemented.

FIG. 5 shows in somewhat more detail one possible implementation of a radio access network node, here for example an RNC 20A. It should be clear that the illustration of the different means and functions is done conceptually to describe the functions needed to carry out the inventive concept and that several modifications are possible and that also the representation of the means and functionalities can be done in other ways.

RNC 20A here comprises BS handling means 21A with a RAB manager 22A. As discussed above RAB manager 22A comprises attribute handling means 23A adapted to receive first and second additional attributes from a core network node at initiation of a RAB assignment procedure. It is supposed that the first and second additional attributes are held in specific attribute holding means 27A which of course can also be seen as included in the attribute handling means 23A. In the RAB manager 22A which is illustrated to conceptually comprise a specific (re)activating means 28A and a deactivating means 29A which are adapted to automatically activate/deactivate the repetitive bearer in agreement with the first and second additional attributes. At each information transfer event a timer T1 26A is set which activates the activating means 28A to reactivate the repetitive bearer when the subsequent transfer event is due. The deactivating means 29A use information about the amount of information, particularly machine generated data, that is to be transferred at each event such that when the defined amount of data has been transferred, the repetitive bearer is temporarily deactivated and put into a sleep mode. Then network (node) resources are made free for other users. This is performed by means of the admission control means 24A and resource handling means 25A which use information about the first and second additional attributes. For the establishment as to whether the relevant amount of data has been transferred or not, a different timer can be implemented to monitor that feature. It is possible to use an additional timer if the transfer rate is known (and assumed to be constant). Normally however the second additional parameter is given as an amount of data in kB. The arrows from the resource handling means 25A in the admission control means 24A simply indicate that the conventional functioning has to be modified for consideration of the repetitive bearers and reserving resources etc. for that purpose.

Figure 6:
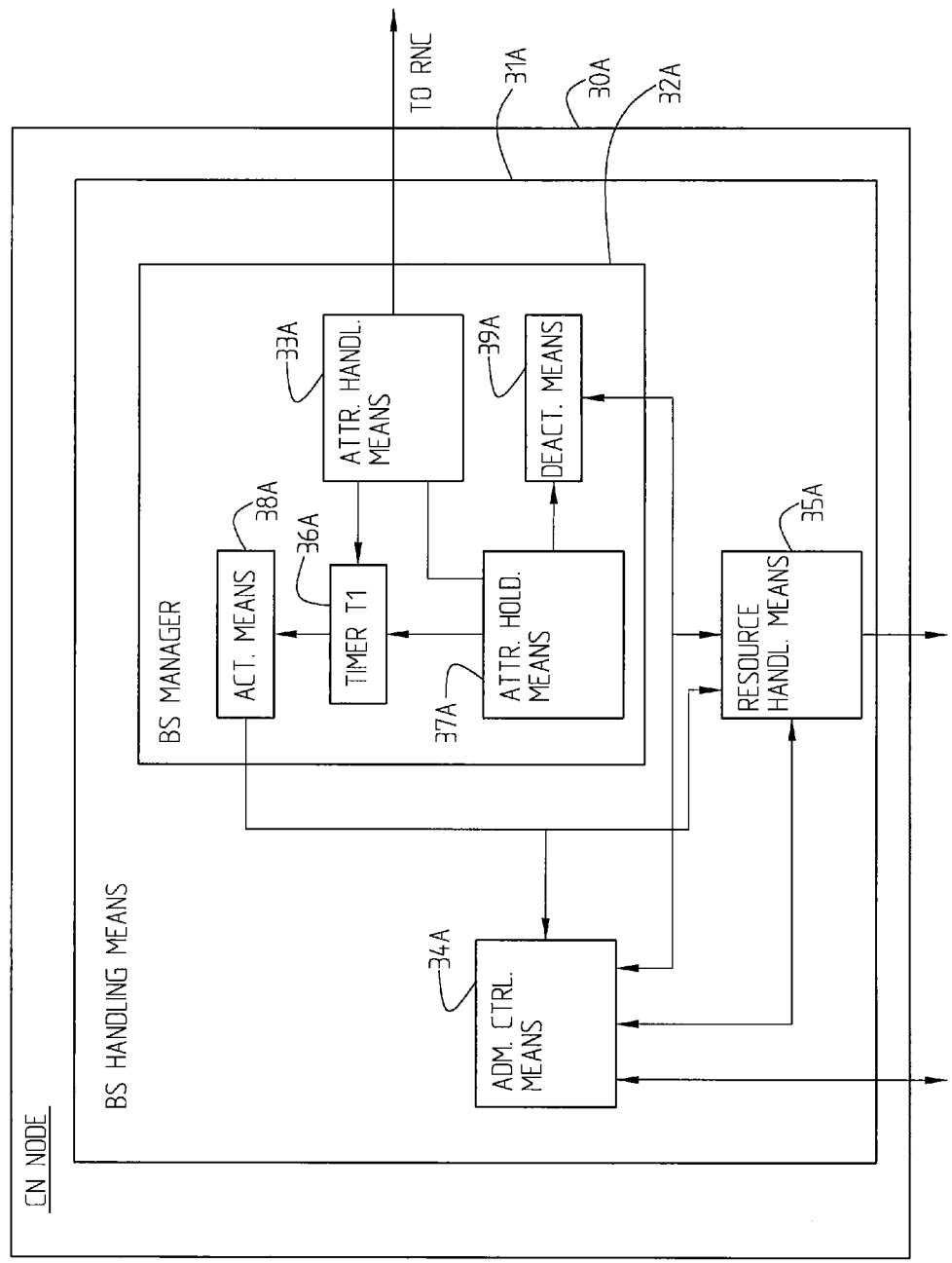
FIG. 6 is a schematical block diagram illustrating a core network node in which the inventive concept is implemented.

FIG. 6 shows a CN node 30A, for example an SGSN (serving GPRS Support Node) or a CGSN (combined GPRS support node). It comprises bearer handling means 31A with BS manager 32A, admission control means 34A and resource handling means 35A functioning substantially as described above with reference to the radio access network node, since both in the core network and in the radio access network bearers have to be established, resources allocated, reserved etc. on the basis of the first and second additional attributes. BS manager 32A comprises attribute handling means 33A, which here, after reception of the first and second attributes from the mobile station, are adapted to initiate a RAB assignment procedure and thereby provide the first and second additional attributes to the radio network node cf. FIG. 5.

Also for this node activating means 38A and deactivating means 39A are conceptually illustrated. The first and second additional attributes are here illustrated as being stored, e.g. cached, in specific attribute holding means 37A, which also may be seen as comprised by or included in the attribute handling means 33A. The functionality of the timer is similar to the functionality described with reference to FIG. 5. Network parameters and references are recorded so that they can be used for the next transfer event, in the admission control means 34A or in the BS manager 32A or in dedicated storing means (not shown). It is also possible to hold said information in the attribute holding means 37A.

Figure 7:
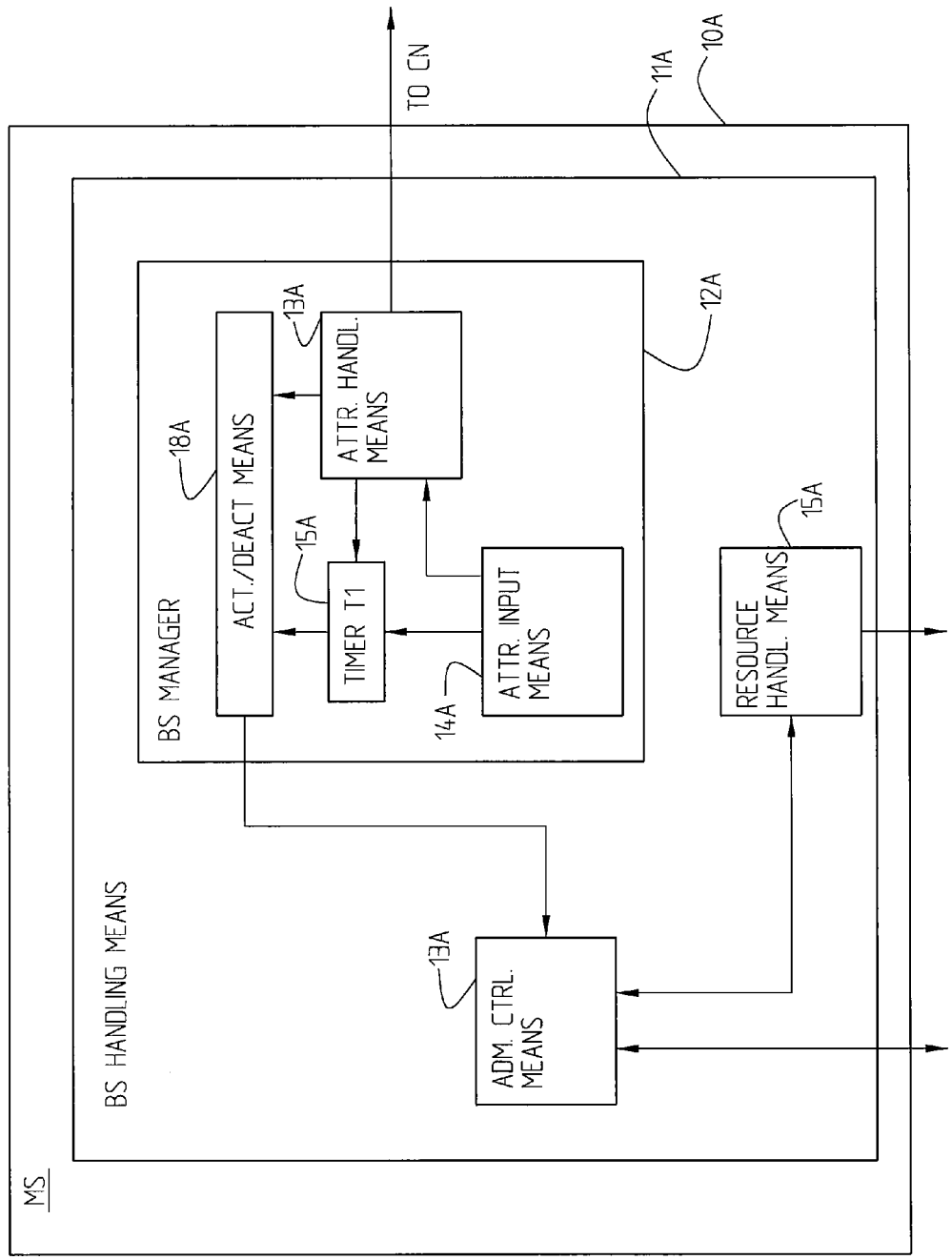
FIG. 7 is a very schematical block diagram of a mobile station in which the inventive concept is implemented.

FIG. 7 is a schematical block diagram of an MS 10A comprising BS handling means 11A, BS manager 12A, admission control means 13A and resource handling means 15A. BS manager is here illustrated as comprising activation/deactivation means 16A, attribute handling means 13A adapted to receive a first and second additional attribute from attribute input means 14A, preferably, but not necessarily via the timer T1 15A. The timer T1 may of course alternatively be set and/or provided with information about the first additional attribute from the attribute handling means 13A. In an alternative implementation a MS does, not include any timer.

It is here supposed that the user puts in the first and second additional attributes by means of an interface comprising attribute input means which provide the first and second additional attributes to attribute handling means 13A. from where the additional attributes are provided to a core network node in a conventional manner to initiate a RAB assignment procedure. In other aspects the BS handling means of the MS function in a conventional manner, for example as described in 3GPP TS 23.107 v6.4.0 discussed above.

Figure 8:
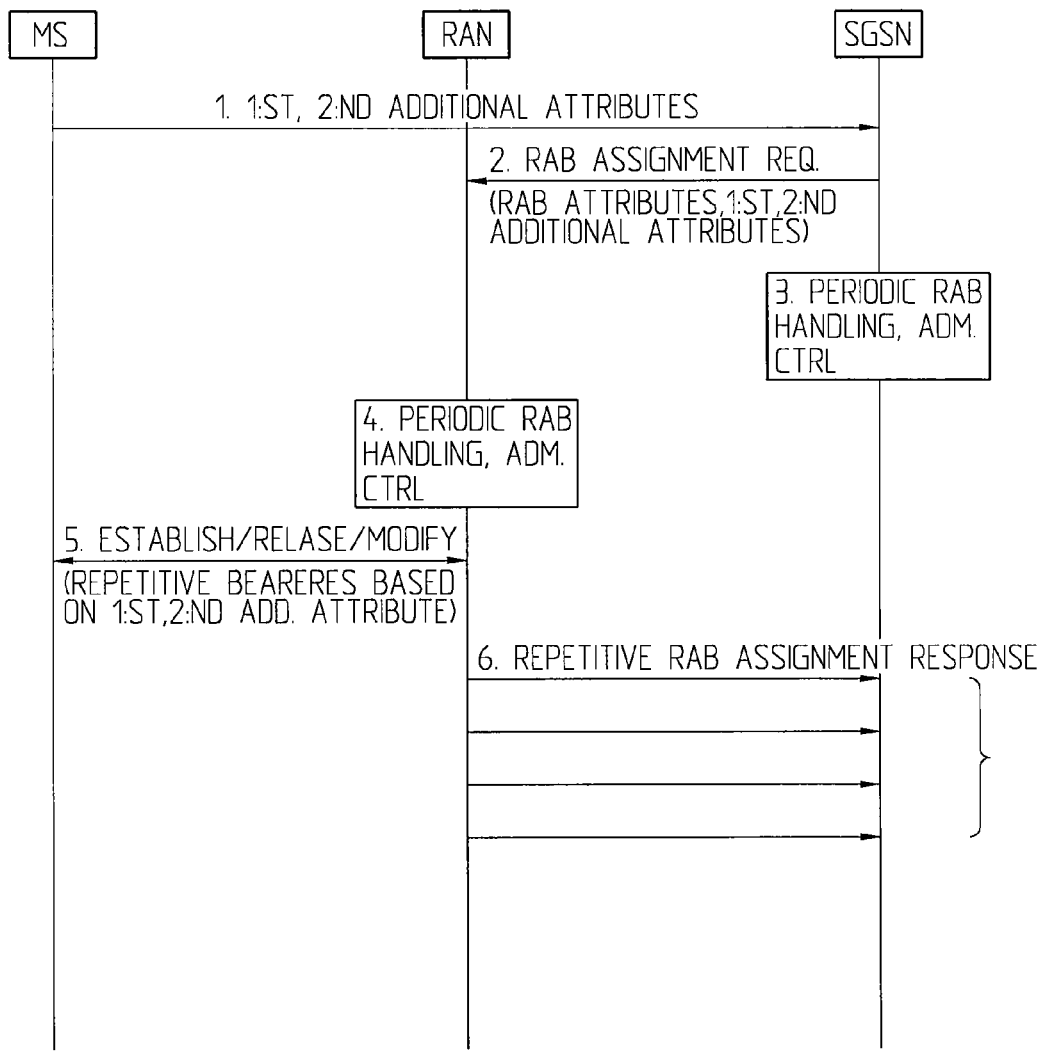
FIG. 8 is a sequence diagram indicating messaging between an MS, a RAN node and a CN node at a first establishment of a repetitive radio access bearer.

FIG. 8 is a very schematical sequence diagram illustrating the basic steps of the inventive procedure. It is supposed that the first and second additional attributes are input and provided from an MS to for example an SGSN, 1. SGSN then sends a RAB assignment request which, in addition to conventional RAB attributes etc., comprise said first and second additional attributes, 2. A periodic RAB handling, updating or modifying admission control means and algorithms thereof, providing for a new admission/capacity management for repetitive or periodic RABs is initiated in SGSN as well as RAN, 3, 4, upon reception of the first and second additional attributes. In a conventional manner signalling for establishment/release/modification of radio bearers is performed between RAN and MS, 5. This is also described in 3GPP TS 23.060, section 12.7.4. In addition thereto this is done for repetitive bearers based on the first and second additional attributes. Subsequently one or more RAB assignment responses are provided from RAN to SGSN, 6. As discussed above a timer is preferably initiated and an assigned repetitive RAB is maintained active as long as the transfer event of the requested amount of data has not been completed, whereupon it is temporarily deactivated or put into a sleep mode.

FIG. 9 schematically illustrates a table for UMTS and radio access bearer attributes for bearer traffic classes: conversational, streaming, interactive, and background modified to also include class repetitive. For the repetitive class, in addition to the "conversational" bearer attributes, the first additional attribute "time interval" and the second additional attribute "information amount at transfer event" are included.

According to the invention the conventional RAB set up procedure described in 3GPP TS 23.060 and referred to above is used to request establishment of a repetitive RAB and to distribute relevant attributes.

The first and second additional attributes are used in addition to the conventional attributes, for example residual BER, SDU error ratio, transfer delay, maximum bit rate, delivery order, delivery of erroneous SDUs etc. as described in FIG. 9. The first additional attribute may be constant or varying (variable or modifiable). The second additional attribute preferably comprises an indication of the amount of data in kB that will be transferred on every transfer event. This may be a fixed attribute or a variable attribute. In different implementations the first and/or the second additional attributes can be varied in a predetermined way, for example at each data transfer event it is allowed to change the data transfer frequency and/or transfer amount. A change may also take place at the occurrence of any given relevant event. Using the first and second additional attributes, an appropriate repetitive RAB is established and resources in CN and RAN are allocated.

It should be clear that the repetitive functionality according to the present invention does not have to constitute a new traffic class. The existing classes can be used, and two attributes can be added for each of the existing classes. This means that a RAB can be a conversational and periodic RAB or a streaming and periodic RAB etc.

Figure 10:
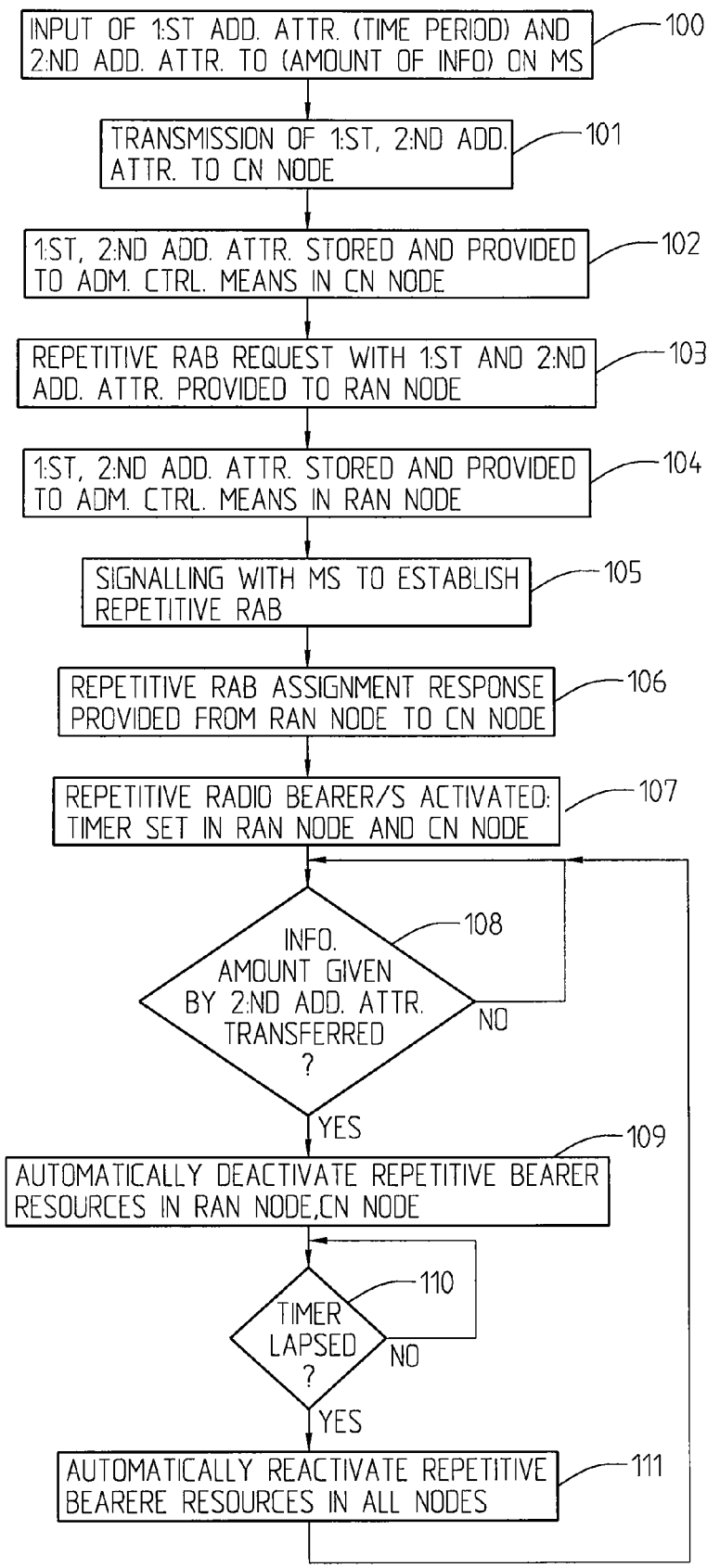
FIG. 10 is a schematical flow diagram describing one implementation of the inventive concept.

A schematical flow diagram is shown in FIG. 10 illustrating the basic steps of a first embodiment of the present invention.

It is supposed that the first and second additional attributes are input to an MS, 100, for example via a user interface. The MS transmits, among other information, said first and second additional attributes to a CN (core network) node, 101. In the CN node the first and second additional attributes are stored more or less temporarily and they are also provided to admission control means in the CN node, 102. A RAB request is in a conventional manner provided to a radio access network node, here called RAN node, but here it is a request for a repetitive bearer, 103. The first and second additional attributes are stored in the RAN node, and also provided to admission control means therein, 104, (as discussed above with reference to the CN node). It should be clear that this does not necessarily mean two different procedures but the storing of the additional attributes can also be seen as done in the admission control means in the respective node where they are temporarily held, either until there is a change to one of them or until reception of a request for release of the repetitive bearer or until the occurrence of a given event.

Conventional signalling is performed with the MS for establishment of a bearer, with the difference that it is modified for a repetitive bearer, 105. When this signalling has been completed a respective RAB assignment response (for a repetitive bearer) is provided from the RAN node to the CN node, 106. The repetitive radio bearer or bearers is/are now activated, and a timer is set in RAN node (preferably also in the CN node) which denotes the time period between two consecutive transfer events, i.e. from activation of a first repetitive RAB to the subsequent reactivation, 107.

It is supposed that some kind of monitoring or detecting means are provided and activated to establish if or when the amount given by the second additional attribute actually has been transferred, 108. As long as it has not been transferred, or the first transfer event is not completed, the repetitive bearer is maintained but when it is established or calculated that it is completed, the repetitive bearer resources in RAN node, CN node etc. are automatically deactivated, 109, without any need for control plane signalling. The timer is monitored, 110, and when it lapses, the repetitive bearer resources are automatically reactivated, in all concerned nodes, 111, and it is proceeded with step 108 etc., here particularly supposing that the first and second additional attributes are unmodified or constant.

Figure 11:
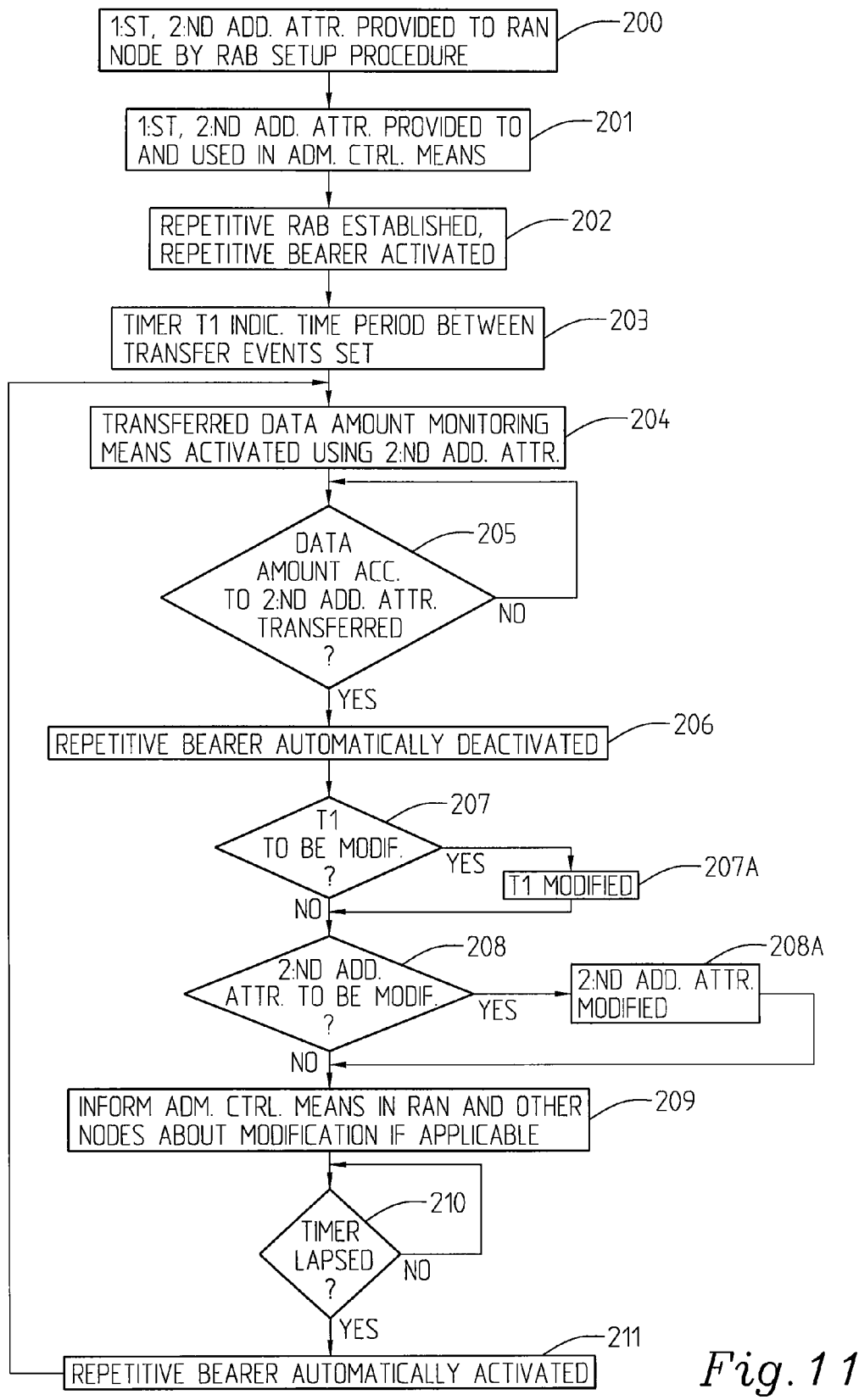
FIG. 11 is a schematical flow diagram describing another exemplary implementation of the inventive concept.

FIG. 11 is a schematical flow diagram of another implementation illustrating the steps that can be taken to establish modification of the first and/or second additional attribute. First it is supposed that a first and second additional attribute are provided to a RAN node by means of a RAB set up procedure, 200. (The preceding steps are not shown here since they are similar to the steps shown in FIG. 10.) As in FIG. 10 the first and second additional attributes are provided to and used in respective admission control means, 201. A repetitive bearer is established 202, and a timer T1 indicating the time period between a first and a second consecutive transfer event, is set, 203. Here it is supposed that monitoring means for monitoring the transferred data amount are activated using said second additional attribute, 204, and it is monitored whether the data amount according to the second additional attribute has been transferred, 205. When it is established that it actually has been transferred, the repetitive bearer is automatically deactivated, 206, and in this embodiment it is established if the timer, i.e. the time period to which a timer is set, is to be modified, 207. If yes, it is modified, 207A, otherwise, after that or at the same time, or vice versa, i.e. in any appropriate order, it is established if the second additional attribute is to be modified, 208. If yes, it is modified, 208A. If applicable, the admission control means in RAN are informed about the modification or modifications, 209. Also, the corresponding admission control means of other nodes are informed about the modifications, if there were any. It is monitored if T1 lapses, 210, if yes, the repetitive bearer is automatically activated again, 211, and it is proceeded with step 204 above, taking any modifications into account.

It should be clear that the invention is not limited to the explicitly illustrated embodiments, but that it can be varied in a number of ways within the scope of the appended claims, the main thing being that at least two additional attributes are introduced in order to provide support for a repetitive or periodic bearer or bearer with such a functionality.

The invention claimed is:

1. A network node supporting communication of information, wherein the network node comprises:
a bearer service handler supporting one or more bearer services, each defined by a number of attributes, and comprising a bearer service manager configured to control enablement, modification and maintenance of bearer services with particular QoSs, a resource handler configured to distribute resources between bearer services requesting transfer of information, an attribute handler configured to handle bearer service attributes and/or QoS attributes or QoS profile for one or more traffic classes, and an admission controller configured to control and hold information about bearer service resource allocation,
wherein the bearer service manager is configured to handle a first additional bearer service attribute comprising information about a time period between at least two consecutive information transfer events and a second additional bearer service attribute comprising information relating to the amount of data to be transferred during at least one of said at least two consecutive information transfer events, and wherein the bearer service manager is configured to activate a bearer service adapted to handle repetitive information transfer at a first transfer event, to provide for deactivation of an activated repetitive bearer service and releasing the repetitive bearer service resources when a respective information transfer event ends and reactivation of the respective bearer service resources at, or before, initiation of a subsequent information transfer event,
wherein the bearer service manager comprises or communicates with a timer, said timer being set to said time period of the first additional attribute and adapted to, at lapse of said time period, trigger re-establishment, or reactivation of the repetitive bearer.

2. A network node according to claim 1, wherein the bearer service manager is configured to control the resource handler, said resource handler being configured to release bearer resources at termination of a transfer event and to reserve resources for reactivation at a subsequent transfer event.

3. A network node according to claim 1, wherein the bearer service manager is configured to communicate information comprising said first and second additional attributes to bearer service managers of all other nodes involved in a bearer set up for the repetitive bearer service, end to end.

4. A network node according to claim 1, wherein the admission controller is configured to hold information about all available resources of the network node and/or about all resources allocated to bearer services and wherein said admission controller is configured to consider information about said first and second additional attributes at allocation of resources.

5. A network node according to claim 1, wherein an attribute holder is configured to hold the first additional attribute defining the timer interval.

6. A network node according to claim 5, wherein the bearer service manager comprises an attribute controller configured to control the attribute handler and configured to at each transfer event, establish if the value of the first attribute is to be maintained or modified and/or to establish, for each transfer event, if the value of the second additional attribute is to be maintained or to be modified.

7. A network node according to claim 1, wherein the attribute handler is configured to hold the first and second additional attributes until a request to modify the first and/or second attribute thus maintaining a periodic, repetitively activated bearer service.

8. A network node according to claim 1, wherein the admission controller comprises or communicates with a non-transitory storage medium configured to store network parameters and references needed at set up of a repetitive bearer at a first information transfer event and for updated network parameters and references modified at a subsequent information transfer event if the first and/or second attribute is/are changed.

9. A network node according to claim 1, wherein the network node is adapted to handle repetitive information transfer comprising data.

10. A network node according to claim 9, wherein the information is machine generated.

11. A network node according to claim 10, wherein the information to be transferred at repetitive transfer events comprises data information generated by sensor networks or monitoring networks.

12. A network node according to claim 1, wherein the network node is adapted to handle repetitive information transfer comprising speech.

13. A network node according to claim 1, wherein for handling repetitive information transfer events, the bearer service manager is configured to send/receive control messages at establishment of an initial repetitive bearer and to perform subsequent/repetitive bearer deactivations/reactivations automatically using said first and second additional attributes.

14. A method for handling repetitive transfer of information in a network node for a mobile network supporting communication of information, the network node comprising a bearer service handler, wherein the method comprises the steps of:
    handling, by a bearer service manager, a first additional bearer service attribute comprising information about a time period between at least two consecutive information transfer events,
    handling, by the bearer service manager, a second additional bearer service attribute comprising information relating to the amount of data to be transferred during at least one of said at least two consecutive information transfer events,
    activating, by the bearer service manager, a bearer service adapted to handle repetitive information transfer at a first transfer event;
    deactivating, by the bearer service manager, an activated repetitive bearer service and releasing the repetitive bearer service resources when a respective information transfer event ends; and
    reactivating or re-establishing the respective bearer service resources at or before initiation of a subsequent information transfer event,
    wherein the reactivating or re-establishing of the respective bearer service resources is triggered by lapsing of a timer set to said time period of the first additional bearer service attribute, and
    wherein the bearer service handler supports one or more bearer services, each defined by a number of attributes, and comprising the bearer service manager configured to control enablement, modification and maintenance of bearer services with particular QoSs, a resource handler configured to distribute resources between bearer services requesting transfer of information, an attribute handler configured to handle bearer service attributes and/or QoS attributes or QoS profile for one or more traffic classes, and an admission controller configured to control and hold information about bearer service resource allocation.

15. A method according to claim 14, wherein the method further comprises the steps of:
    establishing at each transfer event if one or both of said first and second additional bearer service attributes is to be modified or updated, and
    if yes, then updating the values of said one or both of said first and second additional bearer service attributes,
    and if not, then maintaining the values of said one or both of said first and second additional bearer service attributes.

16. A method according to claim 14, wherein the method comprises the steps of:
    setting the timer using said first additional bearer service attribute at a first transfer event or at reception of a first request for a repetitive bearer set up,
    determining when the first transfer event has been completed according to the second additional bearer service attribute and deactivating the repetitive bearer, and
    trigger reactivation of the repetitive bearer upon lapse of said timer.

17. A method according to claim 14, wherein the method comprises the step of:
    allocating and reserving/resources in a core network and a radio access network for said repetitive bearer.

18. A method according to claim 14, wherein the method comprises the steps of:
    sending control messages to all nodes involved only in a first set up of a repetitive bearer, and
    automatically, without control signalling performing said deactivations and re-activations using information about said first and second additional bearer service attributes.

19. A method according to claim 14, wherein the method comprises the steps of, in a core network node and/or a radio access network node:
    providing information about said first and second additional bearer service attributes to respective admission controllers, and
    considering said first and second additional bearer service attributes when allocating bearer resources to assure that resources are available for reactivation of the repetitive bearer.

* * * * *

UNITED STATES PATENT AND TRADEMARK OFFICE
CERTIFICATE OF CORRECTION

PATENT NO. : 8,711,788 B2  
APPLICATION NO. : 12/593190  
DATED : April 29, 2014  
INVENTOR(S) : Krco et al.

Page 1 of 1

It is certified that error appears in the above-identified patent and that said Letters Patent is hereby corrected as shown below:

In the Drawings

In Fig. 1, Sheet 1 of 11, for Tag "1S", in Line 1, delete "SEVICE" and insert -- SERVICE --, therefor.

In Fig. 1, Sheet 1 of 11, for Tag "$3S_1$", in Line 1, delete "ACCES" and insert -- ACCESS --, therefor.

In Fig. 8, Sheet 8 of 11, delete "RELASE" and insert -- RELEASE --, therefor.

In Fig. 8, Sheet 8 of 11, delete "BEARERES" and insert -- BEARERS --, therefor.

In Fig. 9, Sheet 9 of 11, below "TRAFFIC CLASS", Line 19, delete "INTERVALL" and insert -- INTERVAL --, therefor.

In Fig. 10, Sheet 10 of 11, for Tag "111", in Line 2, delete "BEARERE" and insert -- BEARER --, therefor.

In the Specification

In Column 4, Line 46, delete "is a very" and insert -- is a --, therefor.

In Column 12, Line 6, delete "13A. from" and insert -- 13A. From --, therefor.

In Column 12, Line 13, delete "is a very" and insert -- is a --, therefor.

Signed and Sealed this  
Fourth Day of August, 2015

Michelle K. Lee  
*Director of the United States Patent and Trademark Office*